Jan. 2, 1940.    N. A. PALMER    2,185,563
BELT FASTENER
Filed Aug. 30, 1938
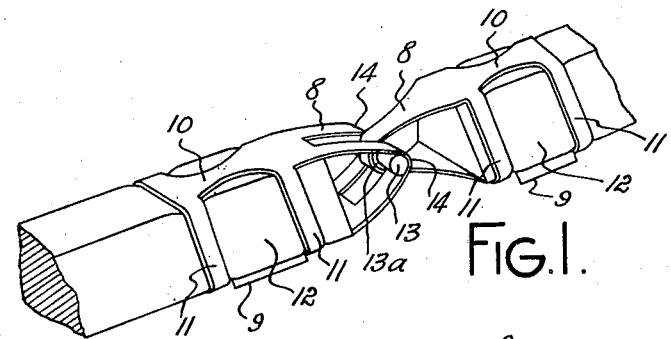
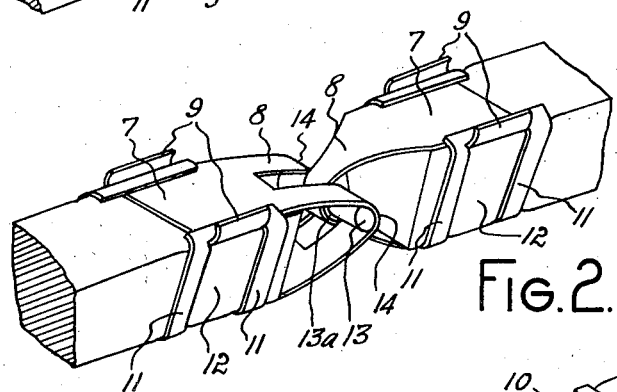
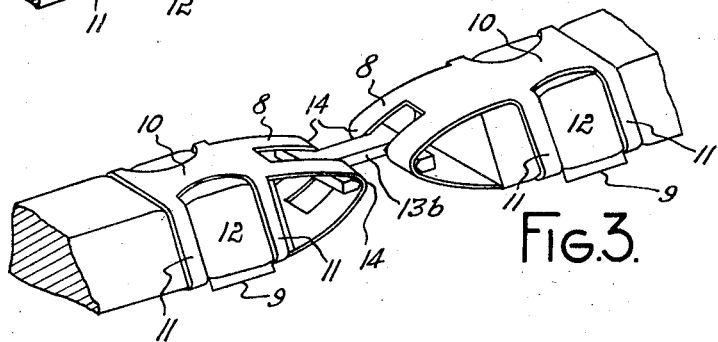
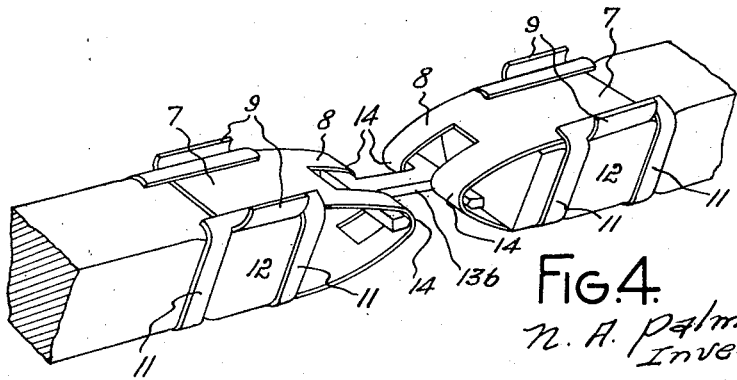

UNITED STATES PATENT OFFICE 2,185,563

BELT FASTENER

Neville Alec Palmer, Paddington, near Sydney, New South Wales, Australia

Application August 30, 1938, Serial No. 227,583
In Australia September 7, 1937

5 Claims. (Cl. 24—33)

The present invention refers to means for linking together the ends of a length of belting to form an endless belt, said means being generally designated belt fasteners.

Various means are known for the above purpose and the present invention is directed to improvements in the type of belt fastener which is constituted of a pair of counter-part V-shaped members one attached by its ends to each abutting end of the belt, and both pivotally linked at the interengaging apices by a detachable link connection.

In some of such known means the free ends of the limbs of said counter-part members are secured to the belt ends by a through bolt involving piercing of the belt which is unsatisfactory in view of the resultant weakening of the belt.

According to the present invention each of the counterpart members constituting a belt fastener, and formed of the known U-shape has projections at one or both of the free ends adapted to form co-acting tongues and clamping loops which engage said tongues.

In one practical arrangement each counter-part member with tongues and a pair of clamping loops is formed from one integral metal strip, the said clamping loops being formed of oppositely disposed parallel projections one from each side edge near one end of the strip. The said clamping loops project above the belt and permit the entry therein of the ends of the tongues formed on the opposite end of the metal strip.

In view of the resiliency of the material constituting the belting the free ends of the counter-part members and the clamping loops according to this invention can be clamped up by any suitable tool to effect an appreciable countersinking into the belting material, and the contacting surfaces may be roughened to effect a greater grip.

The accompanying drawing depicts practical constructions of a belt fastener according to this invention.

In the drawing Figures 1, 2, 3 and 4 are perspective views showing in position on a belt, forms of belt fasteners according to this invention.

Referring particularly to Figures 1 and 2 which are perspective views showing the belt fastener in positions at 180 degrees relative to each other (Figure 1 showing the inner face of the belt uppermost), one free end 7 (see Figure 2) of each counter-part member 8 has a pair of outwardly projecting tongues 9 whereas the other free end 10 (see Figure 1) has outwardly projecting loops 11 extending beyond opposite edges of the belt ends 12 whereby said member 8 and tongues 9 and loops 11 are integral, and the same description applies to Figures 3 and 4.

In Figures 1 and 2 the counter-part members 8 are pivotally linked by a straight pin 13 having an enlarged central portion 13a to form a shoulder which abuts against the inner edge of the bifurcated apex 14 of the counter-part member 8.

Figures 3 and 4 illustrate a modified form of the pivotal link pin 13 consisting of an I-shaped link 13b the ends of which are designed to be entered between the limbs of the bifurcated apex 14 and be turned into the position illustrated.

I claim:

1. A belt fastener of the type specified, comprising a pair of counter-part members pivotally linked together two integral limbs with each of said members, tongues on one of said limbs, and clamping loops on the other of said limbs for engaging the said tongues, said loops and limbs being designed to be countersunk in the belt material without piercing the latter.

2. A belt fastener of the type specified, comprising a pair of counter-part members pivotally linked together, two limbs integral with each of the said members, integral tongues disposed oppositely on one of said limbs, and oppositely disposed clamping loops on the other of said limbs on the same counter-part member for engaging said tongues.

3. A belt fastener of the type specified, comprising a pair of counter-part members pivotally linked together, two limbs integral with each of said members, a tongue projecting from each side edge of one of the said limbs of each counter-part member, and a loop constituting a clamping band projecting from each side edge of the other limb of said member, said tongues being designed to engage the said loops.

4. A belt fastener of the type specified, comprising a pair of counter-part members, two limbs integral with each of the said members, tongues on one of the said limbs, clamping loops on the other of said limbs for engaging tongues, and a transversely disposed pin for pivotally connecting said counter-part members together.

5. A belt fastener of the type specified, comprising a pair of counter-part members, two limbs integral with each of said members, tongues on one of said limbs clamping loops on the other of said limbs for engaging the said tongues, and an I-shaped link for pivotally connecting the said counter-part members together.

NEVILLE ALEC PALMER.